United States Patent
Park et al.

(10) Patent No.: US 12,459,825 B2
(45) Date of Patent: Nov. 4, 2025

(54) HYDROPHOBIC AEROGEL AND METHOD FOR MANUFACTURING THE SAME

(71) Applicant: UIF (University Industry Foundation), Yonsei University, Seoul (KR)

(72) Inventors: Hyung Ho Park, Seoul (KR); Young Hun Kim, Gyeonggi-do (KR); Ji Hun Lee, Gyeonggi-do (KR); Sang Hyun Kim, Gyeonggi-do (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 372 days.

(21) Appl. No.: 17/939,555

(22) Filed: Sep. 7, 2022

(65) Prior Publication Data
US 2023/0083857 A1   Mar. 16, 2023

(30) Foreign Application Priority Data

Sep. 7, 2021  (KR) .................. 10-2021-0119008
Nov. 12, 2021  (KR) .................. 10-2021-0155593

(51) Int. Cl.
   *C01B 33/158* (2006.01)
   *C01B 33/154* (2006.01)
   *F16L 59/02* (2006.01)

(52) U.S. Cl.
   CPC ........ *C01B 33/1585* (2013.01); *C01B 33/154* (2013.01); *F16L 59/028* (2013.01); *C01P 2004/61* (2013.01); *C01P 2006/12* (2013.01); *C01P 2006/16* (2013.01); *C01P 2006/32* (2013.01)

(58) Field of Classification Search
   CPC .......................... C01B 33/1585; C01B 33/154
   See application file for complete search history.

(56) References Cited

U.S. PATENT DOCUMENTS

| | | |
|---|---|---|
| 2009/0082479 A1 | 3/2009 | Cho |
| 2013/0195767 A1 | 8/2013 | Weissleder et al. |
| 2015/0030968 A1 | 1/2015 | Schwab et al. |
| 2018/0127277 A1 | 5/2018 | Kim et al. |
| 2021/0376222 A1 | 12/2021 | Park et al. |
| 2022/0267606 A1 | 8/2022 | Park et al. |

FOREIGN PATENT DOCUMENTS

| | | | | |
|---|---|---|---|---|
| EP | 849220 A1 * | 6/1998 | ......... | C01B 33/1585 |
| JP | 2001-222913 | 8/2001 | | |
| JP | 2018-177620 | 11/2018 | | |
| KR | 10-2011-0045732 | 5/2011 | | |
| KR | 10-2016-0141669 | 12/2016 | | |
| KR | 10-2017-0003401 | 1/2017 | | |
| KR | 10-2019-0119203 | 10/2019 | | |
| KR | 10-2021-0020701 | 2/2021 | | |
| WO | WO-2015119430 A1 * | 8/2015 | ........... | C01B 33/154 |

OTHER PUBLICATIONS

WO2015119430A1 Machine Translation (Year: 2015).*
U.S. Appl. No. 17/337,301, filed Jun. 2, 2021, by Park (not submitted herewith pursuant to the waiver of 37 C.F.R. § 1.98(a)(2)(iii) issued by the Office on Sep. 21, 2004).
Desario et al., "Plasmonic enhancement of visible-light water splitting with Au—TiO2 composite aerogels," Nanoscale (2013) DOI: 10.1039/C3NR01429K, 12 pages.
Fan et al., "Piezoluminescence from ferroelectric Ca3Ti2O7:Pr3+ long-persistent phosphor," Optics Express (2017) 25(13): 14238-14246.
Quirin M. Kainz and Oliver Reiser; "Polymer- and Dendrimer-Coated Magnetic Nanoparticles as Versatile Supports for Catalysts, Scavengers, and Reagents"; Accounts of Chemical Research; vol. 47, Issue No. 2, pp. 667-677 (Year: 2014) (11 pages).

* cited by examiner

*Primary Examiner* — Randy P Gulakowski
(74) *Attorney, Agent, or Firm* — Sughrue Mion, PLLC

(57) ABSTRACT

The present invention provides an aerogel and a method for manufacturing the same, in which the size of the particles can be prepared to be very small and uniform because aerogel particles can be formed in the emulsion, and through this, the size of the pores forming the aerogel can also be prepared to be uniform, and furthermore, since an additional post-treatment step is not required, the excellent properties of the aerogel can be sufficiently used without mechanical deformation of the aerogel to enhance the utilization in various industrial fields.

3 Claims, 6 Drawing Sheets

[FIG. 1]
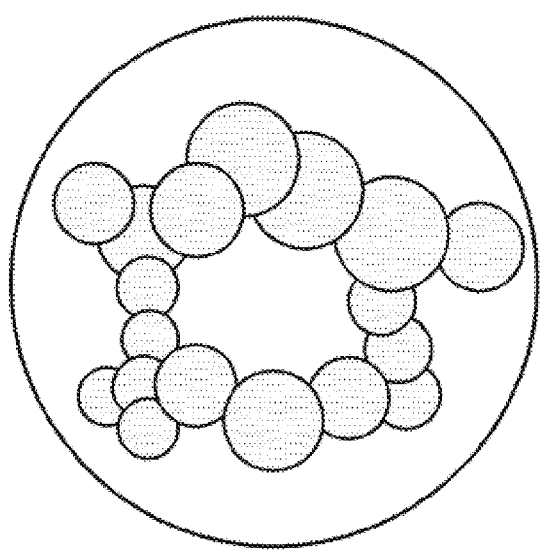
Fine aerogel powder particles

[FIG. 2]
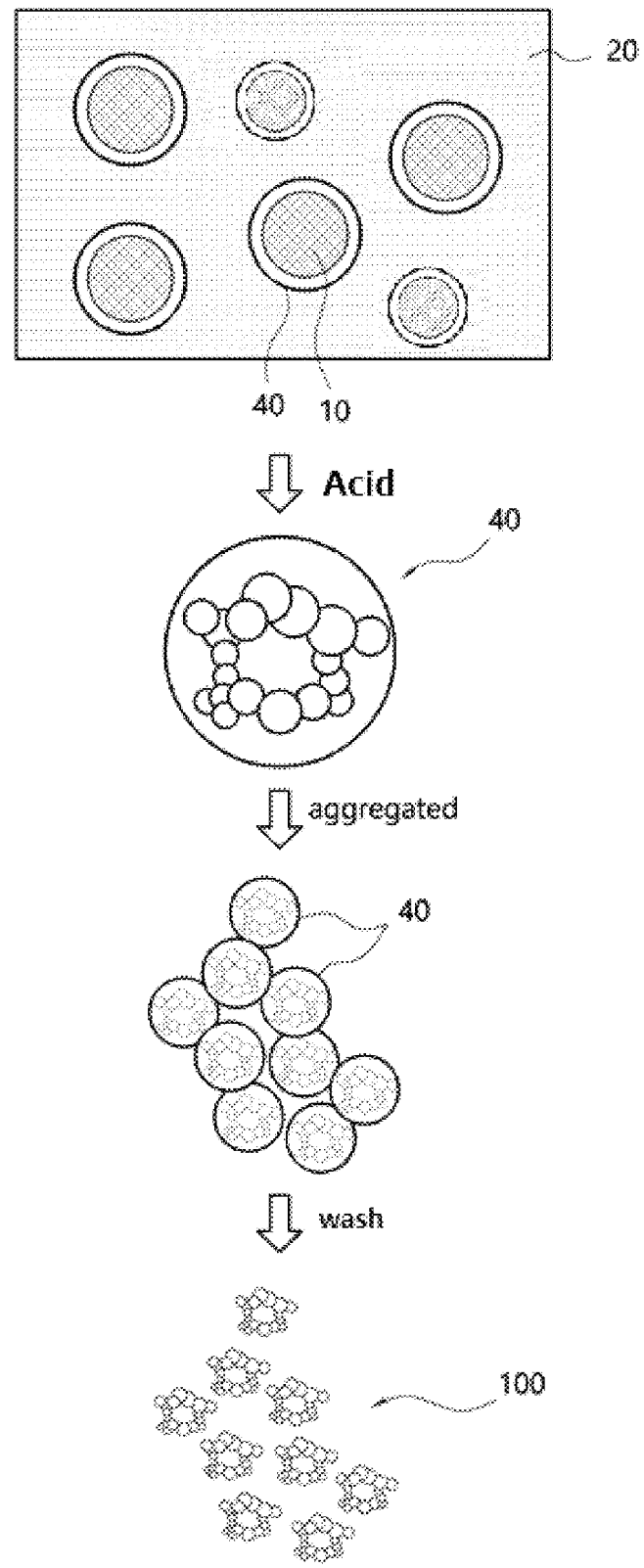

[FIG. 3]
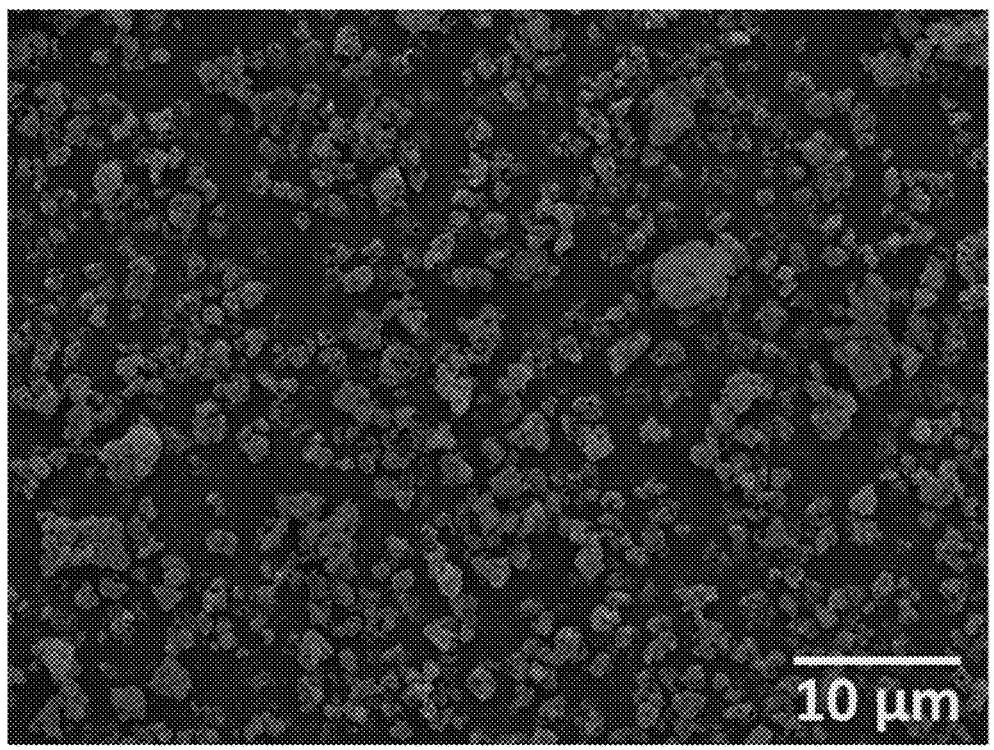

[FIG. 4]
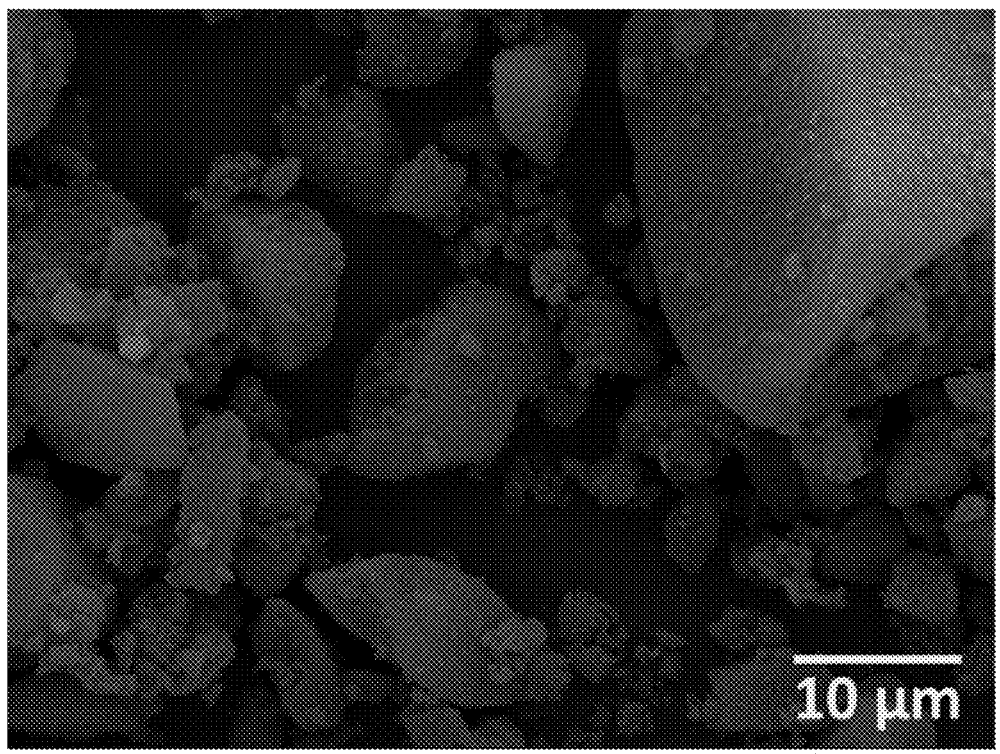

[FIG. 5]
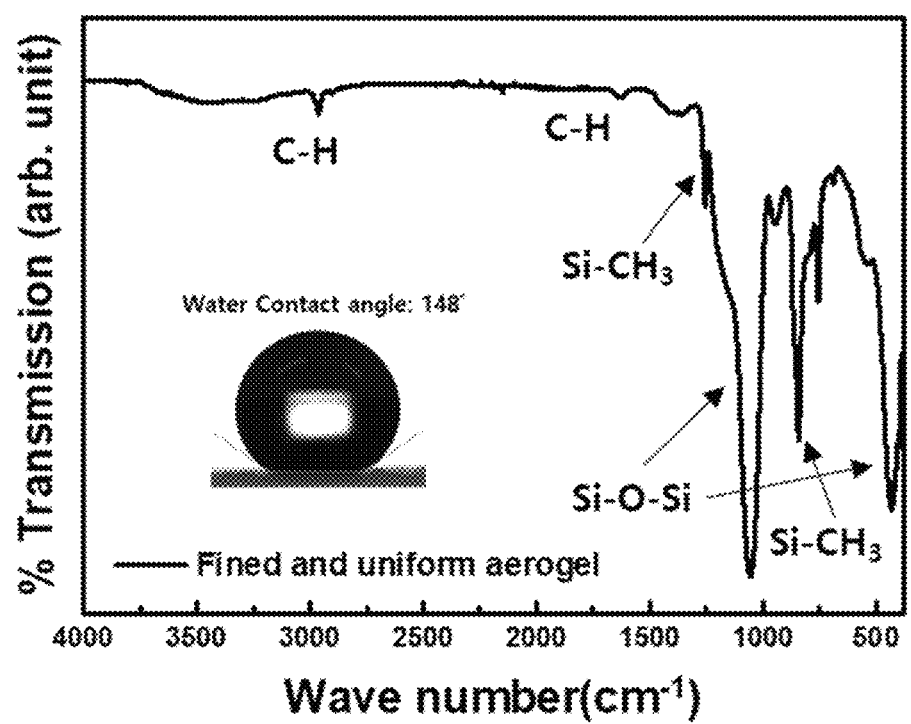

[FIG. 6]
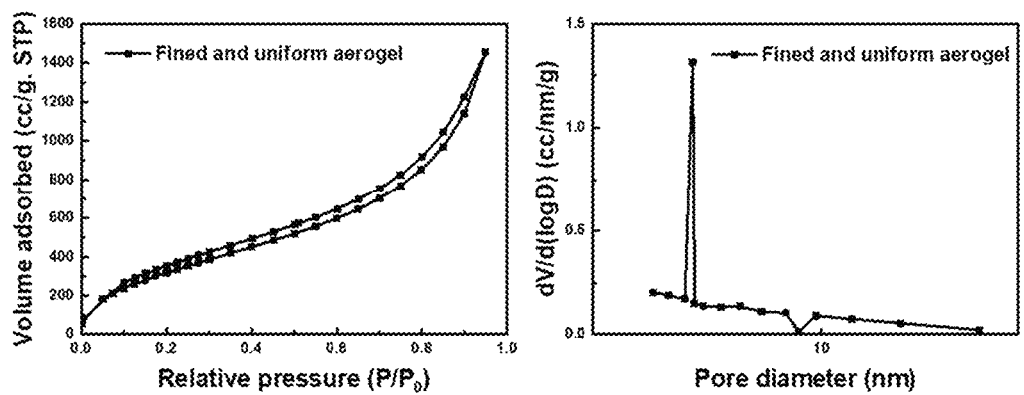

HYDROPHOBIC AEROGEL AND METHOD FOR MANUFACTURING THE SAME

CROSS-REFERENCE TO RELATED APPLICATION

This application claims priority to and the benefit of Korean Patent Application No. 10-2021-0119008, filed on Sep. 7, 2021, and Korean Patent Application No. 10-2021-0155593, filed on Nov. 12, 2021, the disclosures of which are incorporated herein by reference in their entirety.

TECHNICAL FIELD

The present invention relates to a hydrophobic aerogel and a method for manufacturing the same.

BACKGROUND ART

An aerogel is a highly porous material having the highest porosity among solids known to date, and silica aerogel, which is a representative inorganic aerogel, may be made by subjecting a silica precursor solution to the sol-gel polymerization to form a gel, followed by drying under supercritical conditions or atmospheric pressure conditions to obtain an aerogel with a pore structure filled with air. Therefore, due to the unique pore structure in which most of the internal spaces are empty, physical properties such as heat insulation, low light weight, sound absorption, low dielectric constant and the like are exhibited, and thus, the aerogel is attracting attention as a next-generation new material.

However, despite the excellent physical properties expressed due to the unique pore structure of the aerogel as described above, there have been the following problems, which limit its application to various fields.

First, generally, in order to use physical/chemically excellent physical properties such as heat insulation and low dielectric constant of the aerogel, a mixture of the aerogel and other materials is used. In this case, in order to sufficiently use the physical properties of the aerogel and to prepare a uniform mixture, the particle size of the aerogel must be small and uniform, and the aerogel manufactured by prior art. has very large and non-uniform characteristics because the size of the aerogel particle is in a range of 5 to 100 µm. Accordingly, there have been problems in that it is not possible to sufficiently use the excellent physical properties of the aerogel or it cannot be applied to an actual industrial field because the non-uniformity of the physical properties occurs due to the non-uniformity of the particle size.

Second, in order to solve the problem caused by non-uniform particle size as described above, a micronization post-treatment method has been introduced. However, since the post-treatment method such as pulverization for micronization is performed at a high mechanical pressure and temperature, uniformizing the size of the aerogel particle is a distinction, and there have been problems in that the pores of the aerogel are collapsed and thus, it is not possible to use excellent physical properties of the aerogel exerted from the pores at all, and furthermore, since the process is complicated and the productivity is low due to the limitation of noise and capacity due to equipment operation, economic feasibility is inevitably lowered in the process of using the aerogel.

Third, in general, the aerogel manufactured by prior art using the sol-gel method forms pores having a random network structure, and thus, the deterioration of physical properties has inevitably occurred due to the characteristics that the size of the pores is non-uniform as with the particle size of the above-described aerogel. Moreover, since there is no method that can be post-treated homogeneously through micronization like aerogel particles, there have been problems in that the non-uniformity of the pores not only deteriorates heat insulation properties, which are the representative physical properties of the aerogel, but also absorbs a matrix material when the aerogel is mixed with a liquid matrix.

Accordingly, the situation is that there is an urgent need for research on an aerogel, which is capable of uniformly manufacturing the size of the particles of the aerogel and simultaneously uniformly manufacturing the size of the pores forming the aerogel, and additionally capable of omitting an additional post-treatment process, and capable of improving utilization to various industrial fields by sufficiently using the excellent physical properties of the aerogel.

RELATED ART DOCUMENTS

Patent Documents

Korean Patent Application No. 10-2016-014166'-1(Dec. 9, 2016)

DISCLOSURE

Technical Problem

The present invention has been devised to solve the above-described problems, and the problems to be solved by the present invention provide an aerogel and a method for manufacturing the same, in which the size of the particles can be prepared to be very small and uniform because aerogel particles can be formed in the emulsion, and through this, the size of the pores forming the aerogel can also be prepared to be uniform, and furthermore, since an additional post-treatment step is not required, the excellent properties of the aerogel can be sufficiently used without mechanical deformation of the aerogel to enhance the utilization in various industrial fields.

Technical Solution

In order to solve the above-described problems, the present invention provides a method for manufacturing a hydrophobic aerogel, including the steps of (1) preparing a mixed solution of a silicate-based compound, an organosilane-based compound and a surfactant, (2) preparing a hydrogel including a plurality of fine aerogel powder particles by adding an acid and a non-polar solvent to the mixed solution and stirring, and (3) drying the hydrogel to manufacture a hydrophobic aerogel.

In addition, according to an exemplary embodiment of the present invention, the method for manufacturing a hydrophobic aerogel may not further include a post-treatment step of mechanically micronizing the fine aerogel powder particles.

In addition, the organosilane-based compound may be any one selected from trimethylchlorosilane (TMCS), hexamethyldisilazane (HMDS), methyltrimethoxysilane, trimethylethoxysilane, ethyltriethoxysilane and phenyltriethoxysilane.

In addition, the surfactant may be a hydrophobic surfactant having an HLB value of 1 to 8.

In addition, the weight ratio of the surfactant and the organosilane-based compound may be 1:0.1 to 10.

In addition, the present invention provides a hydrophobic aerogel, including a plurality of fine aerogel powder particles, wherein the plurality of fine aerogel powder particles form a porous structure, and wherein the average particle diameter of the plurality of fine aerogel powder particles is 1 to 5 μm.

In addition, according to an exemplary embodiment of the present invention, the coefficient of variation (CV) for the particle diameter of the plurality of fine aerogel powder particles may be 1 or less.

In addition, the hydrophobic aerogel may have a specific surface area of 1,200 $m^2/g$ or more.

In addition, the hydrophobic aerogel may have an average pore diameter of 1 to 5 nm, and wherein the standard deviation of the pore diameter may be 1 nm or less.

In addition, the present invention provides a heat-insulating material, including the hydrophobic aerogel.

Advantageous Effects

According to the present invention, the aerogel can be formed inside micelles formed in the emulsion such that the size of particles can be prepared to be fine and uniform, and through this, the size of the pores forming the aerogel can also be prepared to be uniform, and furthermore, since it does not require an additional post-treatment process, mechanical deformation is not applied to the aerogel or the deterioration of physical properties, such as collapse of pores, is not induced, and thus, it is possible to manufacture an aerogel that can improve the utilization in various industrial fields by fully utilizing the excellent properties of the aerogel.

DESCRIPTION OF DRAWINGS

FIG. 1 is a diagram showing fine aerogel powder particles according to an exemplary embodiment of the present invention.

FIG. 2 is a diagram showing the method for manufacturing a hydrophobic aerogel according to an exemplary embodiment of the present invention.

FIG. 3 is a SEM image of the hydrophobic aerogel according to an exemplary embodiment of the present invention.

FIG. 4 is a SEM image of the aerogel according to Comparative Example 1.

FIG. 5 is a graph of analyzing the surface properties of the hydrophobic aerogel according to an exemplary embodiment of the present invention by using FT-IR equipment.

FIG. 6 is a graph of BET & BJH analysis of the hydrophobic aerogel prepared in Example 1 and Comparative Example 1 of the present invention.

MODES OF THE INVENTION

Hereinafter, exemplary embodiments of the present invention will be described in detail so that those of ordinary skill in the art to which the present invention pertains can easily practice the present invention. The present invention may be embodied in many different forms and is not limited to the exemplary embodiments described herein.

According to the conventional technology for manufacturing an aerogel, the particle size of the aerogel cannot be finely controlled, and even if it is finely controlled, there have been a deterioration in mechanical properties and the inability to uniformly control the pores, and thus, the productivity was low, and it was difficult to apply to various industries.

Accordingly, the present invention has sought to solve the above-described problems by providing a hydrophobic aerogel and a method for manufacturing the same, including the steps of (1) preparing a mixed solution of a silicate-based compound, an organosilane-based compound and a surfactant, (2) preparing a hydrogel including a plurality of fine aerogel powder particles by adding an acid and a non-polar solvent to the mixed solution and stirring, and (3) drying the hydrogel to manufacture a hydrophobic aerogel.

Through this, fine aerogel powder particles may be formed from micelles (or reverse micelles) formed in the emulsion such that the size of the particles may be prepared to be fine and uniform, and the size of the pores forming the aerogel may be prepared to be also uniform. Furthermore, since it does not require an additional post-treatment process, mechanical deformation is not applied to the aerogel or the deterioration of physical properties, such as collapse of pores, is not induced, and thus, it is possible to manufacture an aerogel that can improve the utilization in various industrial fields by fully utilizing the excellent properties of the aerogel.

Meanwhile, the term 'fine aerogel powder particles' used in the present invention refers to a structure in which a plurality of nano-aerogel particles as illustrated in FIG. 1 aggregate to form pores, and does not mean nano-aerogel particles. In addition, the term 'aerogel' refers to an aggregate composed of the fine aerogel powder particles.

Hereinafter, the method for manufacturing a hydrophobic aerogel according to the present invention will be described in detail with reference to FIGS. 2 to 6.

In general, the aerogel according to prior art forms silicic acid by reacting a silicate-based compound with an inorganic acid, and then reacts with an alkaline material to form a surface-modified or gelated hydrogel, followed by drying to manufacture an aerogel. However, in this case, the size of the fine aerogel powder particles included in the aerogel was 10 to 100 μm, and large and small particles were inevitably mixed and formed very evenly, and for the same reason, the pores included in the aerogel were also very large in size, and it was not possible to control the uniformity of the size.

The excellent physical properties such as heat insulation, low light weight, sound absorption and low dielectric properties of aerogel are expressed due to the fine particles of the aerogel or the unique pore structure included in the aerogel, and since the physical properties of the aerogel were also non-uniformly expressed, the excellent physical properties of the aerogel could not be fully used. Furthermore, when using a mixture of the aerogel and other materials, the size of the fine aerogel powder particles constituting the aerogel reaches up to 100 μm, and due to this size, there was a problem in that the filling amount of the aerogel was relatively small, and thus, it was difficult to sufficiently exhibit the desired physical properties.

Accordingly, according to the method for manufacturing the hydrophobic aerogel 100 according to the present invention, as illustrated in FIG. 2, the present invention may uniformly prepare fine aerogel powder particle 50 having a remarkably small size through step (1) of preparing a mixed solution of a silicate-based compound 10, an organosilane-based compound 20 and a surfactant 30.

More specifically, referring to FIG. 2, the fine aerogel powder particles according to the present invention may be formed inside micelles 40 formed by the surfactant and may be formed to have a size of 1 to 5 μm, and more preferably, 1 to 3 That is, step (1) of the present invention is a step of preparing a mixed solution in which the silicate-based compound 10, the organosilane-based compound 20 and the surfactant 30 are mixed, and in the mixed solution, the silicate-based compound 10, the organosilane-based compound 20 and the surfactant 30 are mixed to form an emulsion (water-in-oil emulsion). In this case, when the surfactant 30 is at a certain concentration or higher, the organosilane-based compound 20 becomes a uniform phase, and micelles (or reverse micelles) in which the silicate-based compound 10 is dispersed are formed in this uniform phase such that the silicate-based compound 10 exhibiting hydrophilicity is located inside the micelles 40, and the organosilane-based compound 20 exhibiting hydrophobicity is located outside the micelles 40.

Thereafter, when acid is added in step (2) to be described below, the silicate-based compound 10 reacts with an inorganic acid inside the micelles 40 to form silicic acid (Si—O—Si—O) and then reacts with the organosilane-based compound 20 to form a hydrogel.

As described above, according to the present invention, fine aerogel powder particles are formed in the micelles 40 formed in the emulsion such that, unlike prior art, it is possible to obtain fine aerogel powder particles whose size is controlled to be constant. That is, in prior art, in order to uniformly control the size of fine aerogel powder particles, fine aerogel powder particles having a size of 10 to 20 μm were prepared through an additional post-treatment process such as a ball-mill process, but due to such a post-treatment process, the pore structure was collapsed, and there has been a limitation in using the excellent physical properties expressed due to the unique pore structure of the aerogel.

However, according to the present invention, it is possible to obtain fine aerogel powder particles having a very uniform size despite not performing a post-treatment step of mechanically micronizing the aerogel particles additionally such that the desired physical properties of the aerogel may be fully utilized. Moreover, since it is possible to prepare fine aerogel powder particles with a size of up to 10% compared to the aerogel particles according to prior art in size, it is possible to design application products in which the filling amount of the aerogel is increased by up to 10 times, and it is possible to significantly improve the utilization thereof.

That is, referring to FIG. 3, it can be seen that the fine aerogel powder particles 50 constituting the hydrophobic aerogel 100 according to the present invention have a fine size of 1 to 3 μm, and the size thereof is also uniform. In contrast, the fine aerogel powder particles constituting the conventional aerogel according to FIG. 4 have a very large size (20 μm or more), compared to the fine aerogel powder particles 50 constituting the hydrophobic aerogel 100 according to the present invention, and it can be seen that the size thereof is not uniform. As a result, it can be seen that the micronization/uniformity of aerogel particles are possible only when the fine aerogel powder particles 50 are formed in a state in which the size is controlled inside the micelles 40 formed through the surfactant as in the present invention.

Meanwhile, it can be seen that the aerogel according to prior art has a very large size of the pores as illustrated in FIG. 4 due to the above-described heterogeneous aerogel particle size, and the size thereof is not uniform. This not only lowered the heat insulation properties, which are representative physical properties of the aerogel, but also caused a problem in that the aerogel absorbs a matrix material when it is mixed with a liquid matrix. However, since the fine aerogel powder particles 50 constituting the hydrophobic aerogel 100 according to the present invention may be manufactured uniformly and remarkably small in size as described above, it can be seen that the size of the pores as illustrated in FIG. 3 is also very small and uniform.

In order to achieve the objects of the present invention, as the silicate-based compound 10, conventional materials that are already known to be used in the preparation of the hydrophobic aerogel 100 such as the present invention may be used, and non-limiting examples thereof include tetraalkyl silicate compounds such as tetramethyl orthosilicate (TMOS), tetraethyl orthosilicate (TEOS), methyl triethyl orthosilicate, dimethyl diethyl orthosilicate, tetrapropyl orthosilicate tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, tetradodecyl orthosilicate and the like, or water glass ($Na_2SiO_3$) or a metal alkoxide having 1 to 6 carbon atoms, and more preferably, it may be water glass.

According to a preferred exemplary embodiment of the present invention, when water glass ($Na_2SiO_3$) is used as the silicate-based compound 10, there is no structural change due to the force of the interface between the gas and the liquid during the drying and sintering process, and since it is made by dissipating the solvent inside the material only by capillary force, it may have many pores inside while maintaining its own structure, unlike materials that have undergone a general drying process, and thus, it may be more advantageous in terms of expressing the properties of the aerogel.

In particular, since the reaction to form the fine aerogel powder particles 50 occurs in the structure of the micelles 40 formed by the surfactant 30 of the present invention described above, pores having a uniform size may be prepared.

In this case, as the water glass, water glass diluted with a solvent to 2 to 10 wt. % may be used. As the solvent, organic and inorganic solvents for diluting water glass that are conventional in the art to which the present invention pertains may be used, and water may be used as an example thereof. In this case, if the concentration of the water glass is less than 2 wt. %, the content of silica in the hydrophobic aerogel 100 that is finally manufactured may be low, and if the concentration of the water glass is more than 10 wt. %, the content of silica is too high such that it may be detrimental to the formation of the hydrogel.

Next, the organosilane-based compound 20 may be dispersed outside the micelles 40 formed in the emulsion, and a hydrogel may be formed by the sol-gel reaction. To this end, for the organosilane-based compound 20, an organosilane-based compound having a hydrophobic property such that it may be dispersed outside the micelles 40 formed in the emulsion may be used. As non-limiting examples, the organo silane-b as ed compound 20 may use any one selected from trimethylchlorosilane (TMCS), hexamethyldisilazane (HMDS), methyltrimethoxysilane, trimethylethoxysilane, ethyltriethoxysilane and phenyltriethoxysilane, and preferably, hexamethyldisilazane (HMDS) may be used, and in this case, it may be more advantageous in terms of the formation of the hydrogel.

Next, the surfactant 30 forms micelles 40 in the emulsion such that the hydrophilic silicate-based compound 10 is dispersed inside the micelles 40, and the hydrophobic organosilane-based compound 20 is dispersed outside the micelles 40, and then serves to form the fine aerogel powder particles 50 according to the present invention by the addition of inorganic acid.

In this case, the surfactant 30 should be able to form stable micelles 40 by not reacting with the silicate-based compound 10, the organosilane-based compound 20, an inorganic acid and a non-polar solvent and not ionized. To this end, the surfactant may be a nonionic surfactant having no ionicity. In this case, the micelles 40 are stably formed in the emulsion such that the hydrophilic silicate-based compound 10 and the hydrophobic organosilane-based compound 20 may be easily separated, and furthermore, the reaction may be more advantageous in the micelles 40 due to the penetration of inorganic acid.

In addition, the surfactant may be a hydrophobic surfactant. The hydrophobic aerogel 100 according to the present invention is manufactured by forming a water-in-oil emulsion as described above, and when a surfactant having a smaller hydrophilicity ratio and more hydrophobic is used, it is advantageous to form the water-in-oil emulsion., and thus, the hydrophilic silicate-based compound 10 and the hydrophobic organosilane-based compound 20 may be more easily dispersed, and furthermore, it may be advantageous for synthesizing a micronized/homogenized aerogel by inducing a uniform reaction between the introduced inorganic acid and the surface modifier.

Accordingly, as the surfactant, a surfactant having a hydrophile-lipophile balance (HLB) value of 1 to 8 may be used, and preferably, the HLB value may have a value of 3 to 8. In this case, if a surfactant having an HLB value of more than 8 is used, the desired hydrophobicity may not be obtained such that the hydrophilic silicate-based compound 10 and the hydrophobic organosilane-based compound 20 are not completely dispersed, or it may be detrimental to the formation of a water-in-oil emulsion. In particular, when a surfactant having an HLB value of 3 to 8 is used according to a preferred exemplary embodiment of the present invention, it may be most advantageous to form a water-in-oil emulsion.

To this end, as the surfactant, a known conventional surfactant having the HLB value may be used, and non-limiting examples thereof may be any one selected from sorbitan stearate, glycerol stearate and lecithin, and preferably, it may be glycerol stearate (GMS), and in this case, it may be more advantageous in terms of forming an aerogel having a uniform particle size by inducing the formation of a water-in-oil emulsion having a homogeneous size.

Meanwhile, the weight ratio of the surfactant and the organosilane-based compound may be mixed at a ratio of 1:0.1 to 10, preferably, 1:0.5 to 8, and most preferably, 1:4 to 6. In this case, if the weight ratio of the surfactant and the organosilane-based compound is more than 1:10, the amount of the surfactant is small such that the emulsion may not be formed. In addition, if the weight ratio of the surfactant and the organosilane-based compound is less than 1:0.1, it may be difficult to remove the surfactant during the washing process such that there may be a problem in that the pore structure is collapsed during drying. In particular, according to a preferred exemplary embodiment of the present invention, when the weight ratio of the surfactant and the organosilane-based compound is mixed at a ratio of 1:4 to 6, it is possible to form fine aerogel powder particles 50 having the finest size, and at the same time, the size thereof is also very uniform, and furthermore, the size and uniformity of the pores may also be most excellent.

Next, the method for manufacturing a hydrophobic aerogel 100 according to the present invention includes step (2) of preparing a hydrogel including a plurality of fine aerogel powder particles 50 by adding an acid and a non-polar solvent to the mixed solution and stirring.

The silicate-based compound 10 separated into the emulsion micelles 40 formed in step (1) reacts with the acid introduced in step (2) to form silicic acid (Si—O—Si—O), and silicic acid is again reacted with the organosilane-based compound 20 to form a hydrogel.

In this case, as the acid, a known conventional acid capable of reacting with the silicate-based compound 10 to form silicic acid may be used, and preferably, inorganic acids such as nitric acid, sulfuric acid and hydrochloric acid may be used, and in this case, it may be more advantageous in terms of controlling the reaction rate.

Meanwhile, the formed hydrogel reacts with a non-polar solvent, and solvent exchange between water and the non-polar solvent located in the hydrogel occurs, and layer separation occurs in the solution. To this end, the non-polar solvent is added in a volume of 2 to 10 times the volume of the hydrogel 30 to 600 seconds after the inorganic acid is introduced. and it is stirred at a temperature of 30 to 80° C. for 1 to 5 hours to simultaneously perform surface modification and solvent exchange.

In this case, as the non-polar solvent, a conventional non-polar solvent may be used as long as it meets the purpose of the present invention, and non-limiting examples thereof include hexane, pentane, toluene and the like, and preferably, hexane may be used. In this case, the capillary pressure is low such that it may be advantageous in terms of maintaining the pore structure as the solvent evaporates while maintaining the structure during drying.

Next, the present invention includes step (3) of manufacturing a hydrophobic aerogel by drying the hydrogel obtained in step (2).

In step (3), the hydrogel formed in step (2), reaction by-products and the remaining amount of the surfactant are washed by using a non-polar solvent, and then dried at 50 to 150° C. for 1 to 3 hours to obtained a hydrophobic aerogel including micronized/homogenized fine aerogel powder particles 50. In particular, when drying under normal pressure, it may be advantageous in terms of safe conditions and economic feasibility compared to other drying methods.

Next, the hydrophobic aerogel 100 according to the present invention will be described. However, in order to avoid overlap, the description of the part having the same technical idea as the above-described method for manufacturing a hydrophobic aerogel 100 will be omitted.

The present invention provides a hydrophobic aerogel 100 including a plurality of fine aerogel powder particles 50, and the average particle diameter of the plurality of fine aerogel powder particles 50 is 1 to 5 μm.

In this case, the coefficient of variation (CV) for the particle diameter of the plurality of fine aerogel powder particles 50 may be 1 or less.

The CV value means the coefficient of variation (relative standard deviation) for the particle size of the fine aerogel powder particles 50, and this value indicates how much the deviation of the particle size distribution of the fine aerogel powder particles 50 is based on the average value (arithmetic mean particle size), and it is conventionally obtained as a CV value (no unit)=(standard deviation/average value). As for the CV value, the smaller the CV value, the narrower the particle size distribution (sharp), and the larger the CV value, the wider the particle size distribution (broad).

In other words, since the plurality of fine aerogel powder particles 50 according to the present invention have a CV value of 1 or less, it is possible to implement fine aerogel powder particles 50 with a uniform size having a very small size deviation with respect to the particle size. Due to the fine aerogel powder particles 50 with such a uniform size, the additional post-processing micronization (miniaturization) process in which conventional mechanical deformation is induced may be omitted, and thus, productivity and economic feasibility are remarkably improved, and the excellent electrical/chemical/mechanical properties of aerogel may be fully utilized.

Accordingly, if the CV value of the plurality of fine aerogel powder particles 50 is more than 1, the particle size deviation is large, and thus, uniform physical properties of the aerogel may not be obtained, and the filling amount of the aerogel may not be properly designed when mixed with other materials such that the utilization of the aerogel may be greatly reduced.

In addition, the hydrophobic aerogel 100 may have a specific surface area of 1,200 m$^2$/g or more. In general, since aerogel has a high specific surface area, it is used as a catalyst or adsorbent. In this case, according to the present invention, as described above, the size of the fine aerogel powder particles 50 constituting the aerogel may be made uniformly and remarkably small such that the specific surface area becomes wider, and the utilization of the aerogel may be improved.

Meanwhile, conventionally, aerogels manufactured by using the sol-gel method generally form pores having a random network structure such that the deterioration of the physical properties inevitably occurred due to the non-uniform pore size as with the particle size of the above-mentioned aerogel. Moreover, since there is no method that can be post-treated homogeneously through micronization like aerogel particles, there have been problems in that the non-uniformity of the pores not only deteriorates heat insulation properties, which are the representative physical properties of the aerogel, but also absorbs a matrix material when the aerogel is mixed with a liquid matrix.

Accordingly, the hydrophobic aerogel 100 according to the present invention includes a plurality of pores, and the pore diameter of the plurality of pores is 1 to 5 nm, and the standard deviation of the pore diameter of the plurality of pores may be 1 nm or less, and more preferably, 0.5 nm or less. That is, according to the present invention, by forming the fine aerogel powder particles 50 in the micelles formed in the emulsion as described above, the size of the pore size may be also manufactured to be uniform and very small accordingly.

As described above, according to the hydrophobic aerogel 100 and the method for manufacturing the same according to the present invention, the aerogel may be formed inside the micelles 40 such that the size of particles can be prepared to be fine and uniform, and through this, the size of the pores forming the aerogel may also be prepared to be uniform, and furthermore, since it does not require an additional post-treatment process, mechanical deformation is not applied to the aerogel or the deterioration of physical properties, such as collapse of pores, is not induced, and thus, it is possible to manufacture an aerogel that may improve the utilization in various industrial fields by fully utilizing the excellent properties of the aerogel.

Hereinafter, the present invention will be described in more detail through examples, but the following examples are not intended to limit the scope of the present invention, which should be construed to aid understanding of the present invention.

Example 1

(1) Preparing Mixed Solution of Silicate-Based Compound, Organosilane-Based Compound and Surfactant An emulsion was formed by mixing 7 g of organosilane (HMDS) and 1.75 g of GMS at a weight ratio of 1:0.25 in a 50 (mL) aqueous solution of 5 wt. % water glass and stirring for 4 minutes.

(2) Preparing Hydrogel Including Plurality of Fine Aerogel Powder Particles by Adding Acid and Non-Polar Solvent to Mixed Solution and Stirring 15 g of 20% sulfuric acid was introduced into the emulsion prepared in step (1) for 30 seconds to form a hydrogel under the condition that the pH was maintained below 7. Then, 150 mL of the n-hexane solution was added to triple the amount of the hydrogel and stirred at a temperature of 50° C. for 1.5 hours for 3 hours. In this case, solvent exchange and layer separation of water and hexane contained in the hydrogel pores occurred.

(3) Drying the Hydrogel to Manufacture Hydrophobic Aerogel

After removing the reaction by-products and the nonionic surfactant from the layer-separated hydrogel in step (2) using hexane, stirring was performed again for 3 hours and washing was performed. Thereafter, atmospheric pressure drying was performed at 50° C. for 1 hour and at 150° C. for 2 hours to manufacture an aerogel in which particles were micronized/uniformed to a particle size of 5 μm or less.

Comparative Example 1

It was prepared in the same manner as in Example 1, except that the surfactant was not included as shown in Table 1 below.

TABLE 1

| | Surfactant | | | Organosilane | |
|---|---|---|---|---|---|
| | Type | Weight | HLB | Type | Weight |
| Example 1 | GMS | 1.75 | 3.8 | HMDS | 7 |
| Comparative Example 1 | | None | | HMDS | 7 |

TABLE 2

| | Hydrophobic aerogel | | | | |
|---|---|---|---|---|---|
| | Fine aerogel powder particles | | Pore | | Specific |
| | Average size (μm) | CV value | Average size (nm) | Standard deviation | surface area (m$^2$/g) |
| Example 1 | 2 | 0.14 | 3.5 | 0.34 | 1284 |
| Comparative Example 1 | 26 | 1.2 | About 10 | 6 | 634 |

Experimental Example 1—Measurement of CV Value

The CV values of the hydrophobic aerogels manufactured in Example 1 and Comparative Example 1 were measured, and the results are shown in Table 2.

Referring to Table 2, in the case of Example 1 in which a hydrophobic surfactant showing the most desirable HLB value was used and the weight ratio with organosilane was also included in the numerical range of the present invention, it can be seen that fine aerogel powder particles could be prepared with a remarkably fine size corresponding to about 1/13 compared to Comparative Example 1 without using the surfactant. Furthermore, it can be seen that the CV value was only 0.14 even though the size was remarkably fine such that it could be formed in a very uniform size.

Experimental Example 2—SEM Analysis

The hydrophobic aerogels manufactured in Examples 1 to 8 and Comparative Example 1 were subjected to SEM analysis to measure the size of the fine aerogel powder particles and the pore size, and the results are shown in Table 2. In particular, the SEM photos of Example 1 and Comparative Example 1. are shown in FIGS. 3 and 4, respectively.

Referring to Table 2 and FIGS. 4 and 5, in the case of Example 1 in which a hydrophobic surfactant showing the most preferred HLB value was used and the weight ratio with organosilane was also included in the numerical range of the present invention, it can be seen that the average pore size could be prepared to be about 3 times smaller compared to Comparative Example 1 without using the surfactant, and it can be seen that the uniformity of the pore size was also greatly improved through the standard deviation value.

Experimental Example 3—Analysis of Surface Characteristics

The surface characteristics of the hydrophobic aerogel manufactured in Example 1 were analyzed through FT-IR equipment, and the results are shown in FIG. 5.

Referring to FIG. 5, Si—O—Si bonding was observed near 400 cm$^{-1}$ and 1,100 cm$^{-1}$, Si—CH$_3$ bonding was observed at 750 to 850 cm$^{-1}$ and 1,250 cm$^{-1}$, and C—H peaks were observed at 1,620 cm$^{-1}$ and 3,000 cm$^{-1}$, confirming that a hydrophobic aerogel was formed. In addition, a contact angle of 140° or more was observed, confirming that it had high hydrophobicity.

Experimental Example 4—Analysis of Pore Characteristics

The hydrophobic aerogels manufactured in Example 1 and Comparative Example 1 were subjected to SEM analysis and BET analysis, and the result are shown in Table 2. In particular, the results of Example 1 are shown in FIG. 6.

Referring to Table 2 and FIG. 6, it can be confirmed that the hydrophobic aerogel of Example 1 according to the present invention had a specific surface area of 1,200 m$^2$/g or more, which is significantly higher than the specific surface area 634 m$^2$/g shown in the aerogel manufactured according to Comparative Example 1.

When Experimental Examples 1 to 4 above are summarized, the present invention may form the aerogel inside micelles formed in the emulsion such that the size of particles may be prepared to be fine and uniform, and through this, the size of the pores forming the aerogel may also be prepared to be uniform, and furthermore, since it does not require an additional post-treatment process, mechanical deformation is not applied to the aerogel or the deterioration of physical properties, such as collapse of pores, is not induced, and thus, it is possible to manufacture an aerogel that can improve the utilization in various industrial fields by fully utilizing the excellent properties of the aerogel.

The invention claimed is:

1. A method for manufacturing a hydrophobic aerogel, comprising the steps of:
   (1) preparing a mixed solution of a silicate-based compound, an organosilane-based compound and a surfactant,
   wherein the weight ratio of the surfactant and the organosilane-based compound is 1:0.1 to 10, and
   the surfactant is a hydrophobic surfactant having an HLB value of 1 to 8;
   (2) preparing a hydrogel comprising a plurality of fine aerogel powder particles by adding an acid and a non-polar solvent to the mixed solution and stirring; and
   (3) drying the hydrogel to manufacture a hydrophobic aerogel.

2. The method of claim 1, wherein the method for manufacturing a hydrophobic aerogel does not further comprise a post-treatment step of mechanically micronizing the fine aerogel powder particles.

3. The method of claim 1, wherein the organosilane-based compound is any one selected from trimethylchlorosilane (TMCS), hexamethyldisilazane (HMDS), methyltrimethoxysilane, trimethylethoxysilane, ethyltriethoxysilane and phenyltriethoxysilane.

* * * * *